United States Patent Office 3,509,260
Patented Apr. 28, 1970

3,509,260
COMPOSITION AND METHOD FOR
COMBATTING FUNGI
Herbert L. Wehrmeister, Terre Haute, Ind., assignor to
Commercial Solvents Corporation, New York, N.Y., a
corporation of Maryland
No Drawing. Filed Sept. 6, 1966, Ser. No. 577,156
Int. Cl. A01n 9/22, 9/28
U.S. Cl. 424—272          8 Claims

ABSTRACT OF THE DISCLOSURE

A method for combatting fungi by applying to the organisms and the environment inhibited by them a 2-decenyl-2-oxazoline or a 4,4-alkyl or hydroxyalkyl substituted-2-decenyl-2-oxazoline.

This invention relates generally to oxazoline compositions and method for the preparation thereof and to a method for combatting fungi. In a particular aspect, it relates to oxazoline derivatives of 10-undecenoic acid and the method of using them to combat fungi.

Oxazolines are generally well-known compounds, most of which exhibit a low order of pharmacological activity. Several aryl-substituted oxazolines are useful as antispasmodics, and according to U.S. Patent 2,831,858, 4,4-dialkyl-2-vinyl oxazolines and 4,4-dialkyl-2-isopropenyl substituted oxazolines exhibit fungicidal activity. However, known oxazolines having a straight chain alkyl or nonconjugated alkenyl radical in the 2-position do not exhibit fungicidal activity. For example, 2-oxazolines having a decarboxylated residue of oleic acid or linoleic acid substituted in the position are not fungicidal. 10-undecenoic acid and some of its salts have long been used for fungicidal purposes but oxazolines derived from 10-undecenoic acid have not been previously described.

It is an object of this invention to provide new fungicidal agents.

A second object is to provide oxazoline derivatives of undecenoic acid and method for the production thereof.

Another object of this invention is to provide 2-(9-decenyl)-4,4-dimethyl-2-oxazoline.

Still another object of this invention is to provide a method for combatting fungi.

Other objects will be apparent to those skilled in the art from the description herein.

It has been discovered that compounds corresponding to the following structural formula are fungicidal agents:

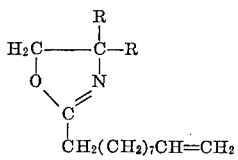

where R can be hydrogen, methyl, ethyl, or hydroxymethyl. These compounds can be produced by reacting 10-undecenoic acid with an alkanolamine having the following formula:

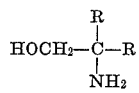

where R has the meaning described above.

The fungicidal oxazolines of this invention generally are prepared by mixing the alkanolamine and the acid in approximately a 1:1 mole ratio, preferably, but not necessarily in the presence of an inert solvent. A solvent capable of forming an azeotrope with water, e.g. benzene, toluene or xylene, is a preferred solvent. A closed kettle equipped with an agitator, a gas sparging line and a reflux condenser with a take-off distillation head is used for the reaction. The kettle is first swept free from oxygen with an inert gas such as $CO_2$, $N_2$, or gas mixture from a gas generator. The gas flow is continued to the end of the reaction period. Air is preferably excluded from the kettle to prevent color development. 10-undecenoic acid is charged to the kettle, then the alkanolamine of choice is added in an amount equal to a mole ratio of fatty acid to alkanolamine of 1:1. Preferably a solvent, e.g. xylene or toluene, is added in an amount approximately from one third to one half the volume of the fatty acid plus alkanolamine mixture. Heat is slowly applied to bring the temperature to about 140–150° C. During this heating period, water of reaction is formed but is retained by the reaction mixture. At about 140–150° C. water is released rapidly and heat input must be carefully controlled to prevent excessive foaming. When the temperature rises to 160° C. and water and xylene are coming off smoothly, the heat is applied more rapidly until the temperature of the reaction mixture reaches 230° C. The reaction mixture is maintained at between about 230° C. and about 260° C. until about two moles of water of reaction have been distilled and an acid number of about 7–10 is reached. During this period most, if not all, the xylene will have been distilled off. If necessary, heating can be continued until there is no substantial xylene residue.

When no solvent is employed, the acid-alkanolamine mixture is heated at a temperature of from about 60° C. to about 260° C., preferably from about 150° C. to about 250° C., until production of oxazoline has been effected, i.e. for a reaction period of 4–12 hours, usually from about 6–8 hours or until about two moles of water or reaction per mole of reactants, i.e. per mole of alkanolamine or per mole of organic acid, have been removed. The oxazoline produced by the above procedures can be used without further purification, but preferably it is purified, e.g. by distillation at reduced pressure.

The alkanolamines useful for preparing the oxazolines of this invention include ethanolamine; 2-amino-1,3-propanediol; 2-amino-2-methyl-1,3-propanediol; 2-amino-2-ethyl-1,3-propanediol; 2 - amino-2-hydroxymethyl-1,3-propanediol; and 2-amino-1-butanol. These alkanolamines are commercially available and commercial grade quality is satisfactory.

The 10-undecenoic acid used for preparing the oxazolines of this invention is commercially available. The commercial grade quality is satisfactory.

The method of combatting fungi of this invention comprises application of the fungicidal oxazolines of this invention to a substratum infested with the fungi to be combatted or to a substratum to be proected from infestation with the fungi. The term substratum as used herein is intended to mean the environment or medium upon which a fungal organism grows and includes both animate and inanimate matter, such as animal and vegetable, living or dead, and the soil. The term fungi is used herein in its broad meaning and is intended to include the bacteria.

The fungicidal oxazolines of this invention can be used without dilution for the control of a wide variety of organisms. Preferably, however, they are used in a dispersed form in a suitable extending agent. These oxazolines are insoluble in water but are soluble in a wide variety of organic substances and are readily emulsifiable in water.

The term "dispersed" is used herein in the widest possible sense. When the fungicidal agents of this invention are said to be dispersed, it can mean that the particles of the fungicidal agents are molecular in the form of a true solution in a suitable organic solvent. It can also mean that the particles are colloidal in size and distributed throughout a liquid phase in the form of particles held in suspension by wetting agents. The term also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal oxazolines of this invention in a carrier such as the chlorofluoroalkanes which boil below room temperature at atmospheric pressure.

The term "extending agent" as used herein includes any and all of those substances in which the fungicidal oxazolines of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal oxazolines of this invention employed for combatting fungal organisms can vary considerably provided the required lethal amount is supplied to the organisms or to the environment which they inhabit. When the extending agent is a liquid (e.g., as in solutions, suspensions, emulsions, or aerosols) the concentration of the fungicidal oxazoline generally will be in the range of 0.001 to 50 percent by weight. When the extending agent is a semi-solid or solid, the concentration of the fungicidal agent generally will be in the range of 0.1 to 25 percent by weight.

Usually it is preferred to supply these oxazolines as a concentrate such as a spray base or a wettable powder, i.e., a particulate solid base in such form that it can be easily mixed with water or a solid extender (e.g. powdered clay or talc) or other low-cost material available at the point of use. In such a concentrate, the fungicidal oxazoline generally will be present in a concentration of 5 to 95 percent by weight. The remainder can be any one or more of the well-known fungicidal adjuvants, such as a surface active agent (e.g. a detergent, soap, or other emulsifying or wetting agent) clays, solvents, diluents, carrier media, adhesives, spreading agents, humectants, and the like.

There are a large number of organic liquids which can be used for the preparation of solutions, suspensions, or emulsions of the fungicidal oxazolines of this invention. For example, the lower aliphatic alcohols, isopropyl ether, acetone, methyl ethyl ketone, dioxane, cyclohexanone, carbon tetrachloride, ethylene dichloride, tetrachloroethane, hexane, heptane and higher liquid alkanes, hydrogenated naphthalenes, solvent naphtha, benzene, toluene, xylene, petroleum fractions (e.g. those boiling almost under 400° F., at atmospheric pressure and having a flash point above about 80° F., particularly kerosene), and mineral oils.

When the fungicidal oxazolines of this invention are to be used in the form of aerosols, it is convenient to dissolve them in a suitable solvent and disperse the resulting solution in the aerosol propellant, i.e., dimethyl ether, propane, dichlorodifluoromethane or other chlorofluoroalkane.

The fungicidal oxazolines of this invention are preferably supplied to the fungal organisms or to their environment in the form of emulsions or suspensions. Emulsions or suspensions are prepared by dispersing one or more fungicidal oxazolines of this invention in water with the aid of a surface active agent. The fungicidal oxazolines can be emulsified directly or they can first be dissolved in an organic solvent and then emulsified. The term "surface active agent" includes the various "emulsifying agents," "dispersing agents," "wetting agents" and "spreading agents" that can be mixed with the fungicidal oxazolines of this invention in order to obtain a dispersion of the oxazolines in water. These surface active agents include the well-known anionic, cationic, or non-ionic surface active agents. In general, the water-soluble non-ionic surface-active agents are preferred.

The fungicidal oxazolines of this invention can be dispersed by suitable methods (e.g., tumbling or grinding) in solid extending agents and supplied to the fungal organism's environment in particulate form. Solid extending agents include both inorganic and organic materials. Inorganic materials include tricalcium phosphate, calcium carbonate, kaolin, bole, kieselguhr, talc, bentonite, fuller's earth, pyrophillite diatomaceous earth, calcined magnesia, volcanic ash, sulfur and the like. Organic materials include powdered cork, powdered wood, and powdered nut shells. The preferred solid extending agents are the adsorbent clays, e.g., bentonite. These mixtures can be used for fungicidal purposes in the dry form, or by addition of water-soluble surface active agents the dry particulate solids can be rendered wettable by water so as to obtain stable aqueous dispersions or suspensions suitable for use as sprays.

For some purposes the fungicidal oxazolines of this invention can be advantageously dispersed in a semi-solid extending agent such as petrolatum or soap (e.g., the sodium salt of a fatty acid) with or without the aid of solubility promoters and/or surface active agents.

The dispersions described above can be used as such in combatting fungal organisms or they can be formulated in a concentrated form suitable for mixing with other extending agents. A useful concentrate is a mixture of one or more fungicidal oxazolines of this invention with a water-soluble surface active agent in the weight proportions of 0.1 to 15 parts of surface active agent with sufficient of the fungicidal oxazoline of this invention to make 100 parts by weight. Such a concentrate can be readily made into a spray for combatting fungal organisms by diluting with water. An example of such a concentrate is a mixture of 95 parts by weight of 2-(9-decenyl)-4,4-dimethyl-2-oxazoline and 5 parts by weight of a water-soluble non-ionic surface active agent such as polyoxyethylene derivative of sorbitan monolaurate.

Another useful concentrate which can be readily made into a spray for combatting fungal organisms is a solution (preferably as concentrated as possible) of one or more fungicidal oxazolines of this invention in an organic solvent therefor, to form a liquid concentrate. Preferably a minor amount (e.g., 0.5 to 10 percent by weight of the weight of fungicidal oxazoline) of a water-soluble surface active agent is also dissolved therein. An example of such a concentrate is a solution of 2-(9-decenyl)-4,4-dimethyl-2-oxazoline in acetone containing a water-soluble polyoxyethylene glycol non-ionic surface active agent and a water-soluble alkylaryl sulfonate anionic surface active agent.

The preferred surface active agents which can be employed in preparing the emulsifiable, wettable or dispersible compositions of this invention include the anionic and non-ionic surface active agents. The preferred anionic surface active agents are the well-known water-soluble alkali metal alkylaryl sulfonates, e.g., sodium decylbenzene sulfonate and sodium dodecylbenzene sulfonate. The preferred non-ionic surface active agents are the water-soluble polyoxyethylene derivatives of alkylphenols and the water-soluble polyoxyethylene derivatives of the mono-higher fatty acid esters of hexitol anhydrides such as mannitan or sorbitan.

The oxazolines of this invention can also be advantageously employed in combination with other pesticides, including, for example, insecticides, nematocides, and herbicides to obtain mixtures which are effective against a wide variety of pests.

In controlling or combatting fungal organisms the fungicidal oxazolines of this invention are supplied to the fungal organisms or to their environment in a lethal or toxic amount. This can be done by dispersing one or more of the fungicidal oxazolines or a composition containing it, in, on or over an environment or substratum infested with, or to be protected from, the fungal organisms. The fungicidal oxazoline or composition containing it can be dispersed in any conventional method which permits contact between the organisms and the fungicidal agents of this invention. Conventional methods include power dusters, boom and hand sprayers, and spray dusters. For subsurface application to the soil such dispersing can be carried out by simply mixing the fungicidal oxazolines as is or compositions containing one or more of them with the soil or by applying a liquid solution of the fungicidal oxazoline to accomplish subsurface penetration and impregnation therein.

EXAMPLE 1

Preparation of 2-(9-decenyl)-4,4-dimethyl-2-oxazoline

A mixture of 50.2 g. of 2-amino-2-methyl-1-propanol (0.57 mole) and 92.4 g. of 10-undecenoic acid (0.5 mole) dissolved in 50 ml. of xylene was delivered to a reaction vessel fitted with a gas sparger, an agitator, and a reflux condenser equipped with a take-off distillation head. Inert gas such as nitrogen or carbon dioxide from a suitable source was sparged through the equipment to sweep it free from oxygen, which if present causes discoloration of the product. Heat was gradually applied until reflux conditions were established and water of reaction was gradually removed as the azeotrope with xylene. After 7 hours of heating at a temperature of 164 to 189° C., 20.6 ml. of a milky water layer was obtained.

The residue containing the 2-(9-decenyl)-4,4-dimethyl-2-oxazoline was distilled at 10 mm. pressure at a temperature of 145–146° C. yielding 66.6 g. of material having the following analysis:

Calc'd: Neutral equiv., 237.4; Nitrogen, 5.90%. Found: Neutral equiv., 240.5; Nitrogen, 5.98%. Infra-Red spectrum: Consistent with expected structure.

The oxazoline was tested against a variety of microorganisms. For comparison, a parallel test using the same species of micro-organisms was run using 10-undecenoic acid, a known anti-fungal agent. The results are as follows:

| Organism name | Inhibitory concentrations, μg./ml. | |
|---|---|---|
| | Oxazoline | 10-undecenoic acid |
| Staphylococcus aureus | 10–50 | 500–1,000 |
| Streptococcus fecalis | 10–50 | 500–1,000 |
| Streptococcus hemolyticus | 10–50 | 500–1,000 |
| Escherishia coli | >1,000 | >1,000 |
| Pasteurella pseudotuberculosis | 10–50 | 100–500 |
| Pseudomonas aeruginosa | >1,000 | >1,000 |
| Shigella dysenteriae | 10–50 | 100–500 |
| Mycobacterium ranae | 10–50 | 100–500 |
| Aspergillus niger | 10–50 | 100–500 |
| Candida albicans | 50–100 | 100–500 |
| Penicillium species | 10–50 | 500–1,000 |
| Fusarium oxysporum | >10 | 50–100 |

The following acute toxicological data were obtained by administering the oxazoline to white mice for the oral and intraperitoneal tests and to laboratory rabbits for the skin irritation tests:

| Route of administration | Acute toxicity | |
|---|---|---|
| | Oxazoline | Undecenoic acid |
| Oral | LD$_0$ 2,600 mg./kg. | |
| | LD$_{50}$ >5,000 mg./kg. | 2,500 mg./kg.* |
| Intraperitoneal | LD$_0$ 600 mg./kg. | |
| | LD$_{50}$ 740±78 mg./kg. | |
| | LD$_{100}$ 1,200 mg./kg. | |

* In the rat; Pharm. Exp. Ther. 98, 31(1950)

Skin irritation score (Draize test) when applied as pure liquid to shaved abdominal skin of rabbit: 2.6 (moderate irritant).

EXAMPLE 2

Preparation of 2-(9-decenyl)-2-oxazoline

Following the general procedure of Example 1, ethanolamine and 10-undecenoic acid are reacted in a mole ratio of approximately 1:1. The product obtained is 2-(9-decenyl)-2-oxazoline. It possesses anti-fungal properties.

EXAMPLE 3

Preparation of 2-(9-decenyl)-4-methyl-4-hydroxymethyl-2-oxazoline

Following the general procedure of Example 1, 2-amino-2-methyl-1,3-propanediol and 10-undecenoic acid are reacted in a mole ratio of approximately 1:1. The product obtained is 2-(9-decenyl)-4-methyl-4-hydroxymethyl-2-oxazoline. It possesses anti-fungal properties.

EXAMPLE 4

Preparation of 2-(9-decenyl)-4-ethyl-4-hydroxymethyl-2-oxazoline

Following the general procedure of Example 1, 2-amino-2-ethyl-1,3-propanediol and 10-undecenoic acid are reacted in a mole ratio of approximately 1:1. The product obtained is 2-(9-decenyl)-4-ethyl-4-hydroxymethyl-2-oxazoline. It possesses anti-fungal properties.

EXAMPLE 5

Preparation of 2-(9-decenyl)-4,4-bis(hydroxymethyl)-2-oxazoline

Following the general procedure of Example 1, 2-amino-2-hydroxymethyl-1,3-propanediol and 10-undecenoic acid are reacted in a mole ratio of approximately 1:1. The product obtained is 2-(9-decenyl)-4,4-bis(hydroxymethyl)-2-oxazoline. It possesses anti-fungal properties.

EXAMPLE 6

Preparation of 2-(9-decenyl)-4-hydroxymethyl-2-oxazoline

Following the general procedure of Example 1, 2-amino-1,3-propanediol and 10-undecenoic acid are reacted in a mole ratio of approximately 1:1. The product obtained is 2-(9-decenyl)-4-hydroxymethyl-2-oxazoline. It possesses anti-fungal properties.

EXAMPLE 7

Preparation of 2-(9-decenyl)-4-ethyl-2-oxazoline

Following the general procedure of Example 1, 2-amino-1-butanol and 10-undecenoic acid are reacted in a mole ratio of approximately 1:1. The product obtained is 2-(9-decenyl)-4-ethyl-2-oxazoline. It possesses anti-fungal properties.

What is claimed is:

1. A method for combatting fungal organisms by applying in an amount lethal to said fungal organisms and to the environment inhabited by them, an oxazoline corresponding to the formula

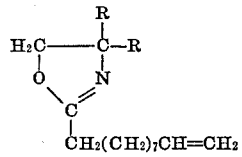

where R is hydrogen, methyl, ethyl, or hydroxymethyl.

2. The method of claim 1 for combatting fungi on a substratum by treating said substratum with 2-(9-decenyl)-4,4-dimethyl-2-oxazoline.

3. The method of claim 1 for combatting fungi on a substratum by treating said substratum with 2-(9-decenyl)-2-oxazoline.

4. The method of claim 1 for combatting fungi on a substratum by treating said substratum with 2-(9-decenyl)-4-methyl-4-hydroxymethyl-2-oxazoline.

5. The method of claim 1 for combatting fungi on a substratum by treating said substratum with 2-(9-decenyl)-4-ethyl-4-hydroxymethyl-2-oxazoline.

6. The method of claim 1 for combatting fungi on a substratum by treating said substratum with 2-(9-decenyl)-4,4-bis(hydroxymethyl)-2-oxaline.

7. The method of claim 1 for combatting fungi on a substratum by treating said substratum with 2-(9-decenyl)-4-hydroxymethyl-2-oxazoline.

8. The method of claim 1 for combatting fungi on a substratum by treating said substratum with 2-(9-decenyl)-4-ethyl-2-oxazoline.

References Cited

UNITED STATES PATENTS

| 2,960,433 | 11/1960 | Eden | 167—33 |
| 3,157,668 | 11/1964 | Little et al. | 167—33 XR |
| 3,389,145 | 6/1968 | Katz. | |

FOREIGN PATENTS 1,385,727  12/1964  France.

ALBERT T. MEYERS, Primary Examiner

D. R. MAHANANI, Assistant Examiner

U.S. Cl. X.R.

252—106, 107; 424—45, 357

PO-1050
(5/69)

UNITED STATES PATENT OFFICE
CERTIFICATE OF CORRECTION

Patent No. 3,509,260      Dated April 28, 1970

Inventor(s) Herbert L. Wehrmeister

It is certified that error appears in the above-identified patent and that said Letters Patent are hereby corrected as shown below:

In column 2, line 53, "proected" should read --protected--.

In column 5, line 72, "Pharm. Exp. Ther." should read --J. Pharm. Exp. Ther.--.

SIGNED AND SEALED
SEP 15 1970

(SEAL)
Attest:

Edward M. Fletcher, Jr.
Attesting Officer

WILLIAM E. SCHUYLER, JR.
Commissioner of Patents